Patented Apr. 20, 1943

2,316,968

UNITED STATES PATENT OFFICE 2,316,968

OIL BASE DRILLING FLUID

George Miller, San Marino, Calif.

No Drawing. Application August 22, 1941,
Serial No. 407,905

4 Claims. (Cl. 252—8.5)

This invention relates to oil base drilling fluids of the type employed in oil and gas wells.

Oil base drilling fluids usually include, in addition to the oil base, a weight material, a material for providing plastering properties, and a material for providing the drilling fluid with gel properties. The material added to impart weight to the drilling fluid is in the form of a finely divided solid, such for example as crushed oyster shells, limestone, barytes, etc., which must be maintained suspended in the drilling fluid. Blown asphalts have been added to such oil base drilling fluids for the purpose of improving the plastering properties thereof. There has also been added to oil base drilling fluids so-called gel imparting agents, such as lamp black, magnesium oxide, calcium hydroxide, etc.

However, the oil base drilling fluids previously employed have proved unsatisfactory in many instances. I have discovered that the reason for the frequent unsatisfactory action of the oil base drilling fluids heretofore employed has been due to the failure of such drilling fluids to have incorporated the correct type of asphalt. The art has previously assumed that the sole function and purpose of the addition of asphalt to an oil base drilling fluid has been to impart desirable plastering properties to the drilling fluid, whereas I have found that the gel properties of an oil base drilling fluid are largely dependent upon the character of the asphalt employed. Unless the asphalt employed is of a character capable of contributing certain desirable gel properties to the oil base drilling fluid, a satisfactory drilling fluid can not be produced by the addition of auxiliary gel materials.

It is, therefore, the major object of the present invention to provide an oil base drilling fluid containing asphalt effective for imparting not only desirable plastering properties to the drilling fluid, but also effective for imparting to the drilling fluid satisfactory gel properties.

It has been heretofore appreciated that air blown asphalts impart better plastering properties to an oil base drilling fluid than steam refined asphalts. The blown asphalts heretofore employed, however, have not possessed the property of imparting to the oil base drilling fluid the desirable gel strength properties, particularly at high temperatures. For example, a drilling fluid previously employed containing air blown asphalt, usually considered satisfactory for its plastering properties, and lamp black as a gel agent possessed satisfactory gel properties only up to a temperature of 160° F. At higher temperatures, the weight material settled from the drilling fluid and the drilling fluid became unsatisfactory in use. I have discovered that by employing a better gel material, such as calcium hydroxide, the gel strength of such a drilling fluid can be made satisfactory up to a temperature of 200° F. However, the bottom hole temperature of many wells now being drilled is in excess of these temperatures and accordingly such oil base drilling fluids do not operate satisfactorily in such wells. In order to provide an oil base drilling fluid satisfactory for operation in wells having high bottom hole temperatures, it is necessary to employ in the oil base drilling fluid asphalt which will impart superior gel properties to the drilling fluid. It is not practical to use asphalt of insufficient gel strength and attempt to increase the gel strength of the resulting drilling fluid by the addition of increased quantities of settling inhibitors, such as lamp black, calcium hydroxide, or magnesium oxide. This is due to the fact that if the asphalt employed is weak in gel properties, one must add such a quantity of settling inhibitor to stabilize the drilling fluid at high temperatures that the gel strength and viscosity of the drilling fluid at low temperatures becomes too great for the use of the drilling fluid, and for the further reason that the addition of such quantities of settling inhibitors impair the plastering and deplastering properties of the mud fluid.

A part of the discovery of the present invention is that the gel strength of a drilling fluid containing asphalt as the plastering agent is governed in part by the melting point of the asphalt employed. Apparently, the gel strength of the drilling fluid becomes unsatisfactory whenever the drilling fluid is raised to a temperature close to the melting point of the asphalt employed. Thus, as far as I am aware, blown asphalts previously employed in drilling fluids have had melting points not exceeding 232° F., and such drilling fluids can not be made to retain suitable gel properties at temperatures above 200° F., and as ordinarily compounded have unsatisfactory gel strength at temperatures as low as 160° F. An oil base drilling fluid which has a satisfactory gel strength is one which will not settle out weight material or other ingredients if allowed to stand quiescent for a period of twenty-four hours. The term "satisfactory" also implies that the weight material or other ingredients must not settle out over a range of both low temperatures and at the highest temperatures expected to be encountered in a well;

furthermore, the gel strength must not be so high that the drilling fluid is not readily pumpable or free-flowing throughout the temperature range to be expected.

Accordingly, the present invention employs an air-blown asphalt having a high melting point, i. e., a melting point above 260° F., and preferably around 260-280° F. although asphalts having melting temperatures up to about 310° F., or higher, may be employed. The higher the melting point of the asphalt (within limits) the better the gel strength which will be imparted by that asphalt to the drilling fluid. Not all high melting point asphalts lend good gel strength, as some stocks when air-blown until they have a low penetration, i. e., from 0 to 5 at 25° C., impart little or no gel strength, while others may impart a satisfactory gel strength. The asphalt must be selected both from the standpoint of its melting point and its penetration. The penetration of a high melting point blown asphalt is normally lower than the penetration of the lower melting point asphalts. Ordinarily, as the penetration of the asphalt decreases (between 8 and 0), its plastering properties decrease. The asphalt selected must, therefore, be one having a high melting point and also a satisfactorily high penetration. Many air-blown asphalts have too low a penetration at melting points of 260° F., or higher, to impart satisfactory plastering properties to a drilling fluid. By selection of stocks and by proper blowing technique (well-known to the oil refiner), it is possible to produce asphalts having penetrations around 8 to 14 with melting points around 275 to 260° F., and of a rubbery nature, which asphalts I regard as the most suitable for the purposes of the present invention. Where the drilling fluid is to be used at extremely high temperatures, it may be preferable to use even higher melting point asphalt, and thus I include in the asphalts usable for the purposes of the present invention asphalts having a penetration of from 6 to 14 and a melting point of 310 to 260° F., the higher penetrations being, of course, associated with the asphalts having the lower melting points.

A disadvantage of using an asphalt of too high a melting point is that during the operation of mixing the asphalt with the oil base of the drilling fluid, if the asphalt has too high a melting point and too low a penetration, it is difficult to cut the asphalt back with the required type of oil.

Where the drilling fluid is to be used with very high bottom hole temperatures, say a bottom hole temperature in the neighborhood of 350° F., even higher melting point asphalts than above indicated may be required. The use of air-blown asphalts derived by an air-blowing process having a very high melting point, such as above 350° F., usually results in a drilling fluid having unsatisfactory plastering properties, but very good gel strength. It is a part of the discovery of the present invention that certain natural asphalts lend very good plastering properties to oil base drilling fluids. On the other hand, natural asphalts lend little or no gel strength to the drilling fluid, although they usually have a high melting point and seldom have a penetration of over 2 or 3 at 25° C. By mixing natural asphalts, such as gilsonite, glance pitch, some types of grahamite, natural lake asphalts, etc., with certain high melting point air-blown asphalts, satisfactory plastering properties may be secured in a drilling fluid intended to operate at high temperatures. Thus, whenever a drilling fluid is to be added to a well having high bottom hole temperatures, say above 280° F., the proper melting point air-blown asphalts for use at such high temperatures may have insufficient plastering properties, but a satisfactory drilling fluid may be derived by adding natural asphalt.

The precise reason why certain asphalts are capable of imparting to an oil base drilling fluid a suitable gel strength while other asphalts having the same melting point may be unsuitable is believed to be the difference in the quantity and form of the petrolenes and asphaltenes contained in such asphalts. The petrolenes consist of so-called asphaltic resins and oily constituents. According to some authorities, the asphaltenes are made up of particles of elementary carbon which absorb some of the petrolenes and are thus kept dispersed in the oily medium. Other authorities consider the asphaltenes to be hydrocarbons of high molecular weight—aromatic or hydroaromatic in nature—and the asphaltenes are assumed to be dispersed in the petrolenes or asphaltic resins. It is considered that it is the action of the petrolenes on the asphaltenes which will determine the elastic and plastic properties of the asphalt. When the ratio of petrolenes to asphaltenes is reduced as by air-blowing, the asphaltenes adhere to each other in a flocculated condition so that their free motion is impeded. When the asphaltenes are of the proper colloidal particle size, the asphalt is capable of imparting the desired plastering properties to a drilling fluid. If a given stock or residuum is blown long enough, the asphaltene content not only increases in quantity but also the asphaltenes increase in size. This tends to decrease the penetration of the asphalt and make the product harder. Thus, as the molecular or particle size of the asphaltenes increases beyond the colloidal size, the plastering properties decrease. It is, therefore, not true that all air-blown asphalts possess desirable plastering properties for oil base drilling fluids, since when the blowing process is continued far enough a point is passed where the plastering properties of the asphalt produced are at a maximum. The penetration or hardness or elasticity of a blown asphalt is chiefly due to the status of the petrolenes, which in turn determine the gel strength that such asphalt may impart to the drilling fluid. It, therefore, follows that in order to obtain the maximum plastering properties and the desired gel strength at high temperatures from a certain blown asphalt, the blowing process must be continued until a certain definite range is reached, and no further. It is well known that certain petroleum stocks tend to produce asphalts containing different quantities and qualities of petrolenes and asphaltenes than other stocks. Certain stocks when blown to produce asphalt produce asphalts having low penetration and also poor elastic or gel properties. Such stocks are unsatisfactory for the production of a drilling fluid for use at high temperatures, and it follows that in order to provide the correct asphalt for an oil base drilling fluid it is necessary, therefore, to select a stock which produces an asphalt having a high penetration and rubbery or elastic nature and to air-blow such asphalt within correct melting point limits.

The constituents of an asphalt or the form of such constituents which govern the gel strength of the asphalt are susceptible to alteration. Thus, if the correct asphalt is heated above its melting point during the cut-back process, the gel strength of the resulting cut-back asphalt is impaired. Thus, a desirable oil base drilling fluid containing asphalt should never be subjected to a heat above the melting point of the asphalt used. Bottom hole temperatures of 240° F. have been reported in drilling practice, and, therefore, in accordance with the present invention the asphalt selected should have a melting point of at least 260° F., and preferably around 270 or 280° F. The gel strength of the asphalt can also be seriously affected by the employment of the wrong type of oil in the oil base drilling fluid. Oils containing material quantities of aromatic constituents are unsatisfactory since they tend to change the relationship between the petrolenes and asphaltenes and to dissolve the asphaltenes. I have discovered that a satisfactory oil base drilling fluid for use at high temperatures can only be produced by the use of a good refined oil, i. e., one relatively free of aromatics. Any good refined oil, such as absorption oil, Dieseline oil, or stove oil, is satisfactory, whereas many poorly refined distillates, Diesel fuels, crude oils, etc., are undesirable.

As an example of a drilling fluid embodying the present invention, I have produced satisfactory drilling fluids using 50% by weight of a refined stove oil, 33% by weight of ground oyster shells as weighting material, and 4% of calcium hydroxide as a settling inhibitor, with 13% of blown asphalt having a melting point of 303° F., and a penetration of 7 at 25° C. I have also produced satisfactory drilling fluids using the same proportions of ingredients, but substituting a blown asphalt having a melting point of 260° F., and a penetration of 11 at 25° C. In another example, the blown asphalt employed had a melting point of 270° F., and a penetration of 10. In another example, the blown asphalt employed had a melting point of 280° F., and a penetration of 9. All of such oil base drilling fluids possess desirable gel properties both at low temperatures and temperatures up to and exceeding 240° F.

Many other examples of the invention may be given. By adhering to the following rules, a satisfactory drilling fluid will be produced. The correct type of asphaltic bitumen should be used which will not only impart plastering properties but also gel strength when exposed to high temperatures. The allowable range for the air-blown asphalt used should be a melting point of 260° F. to 310° F., and a penetration of 14 to 6 mm. at 25° C. The correct type of settling inhibitor should be employed, such as calcium hydroxide. The correct type of oil for the suspending medium should be employed, such as a refined absorption oil or stove oil, or oil relatively free of aromatic constituents. The drilling fluid should not be heated to a temperature above the melting point of the asphalt employed.

The foregoing rules define the prerequisites of a satisfactory oil base drilling fluid employing air-blown asphalt. In certain cases, as previously pointed out, it may be desirable to add some natural asphalts. The melting point of most natural asphalts is fairly high, while the penetration of such asphalts may be as low as zero and up to 3. Whereas air-blown asphalts (produced from the correct stock) which have a high melting point and a low penetration possess good gel properties and inferior plastering properties, natural asphalts of the same melting point and perhaps an even lower penetration have good plastering properties and poor gel strength at high temperatures. By mixing natural asphalts and air-blown asphalts, satisfactory drilling fluids may be produced.

The invention is of the scope set forth in the appended claims.

I claim:

1. An oil base drilling fluid, comprising an oil, a finely divided weight material, a settling inhibitor, and an air-blown asphalt capable of imparting both plastering properties and satisfactory gel properties to the drilling fluid at temperatures in excess of 200° F., and having a melting point of 260 to 310° F. and a penetration of 14 to 6 at 25° C.

2. An oil base drilling fluid, comprising an oil substantially free of aromatic constituents, a finely divided weight material, calcium hydroxide as a settling inhibitor, and an air-blown asphalt having a melting point of 260 to 310° F. and a penetration of from 14 to 6 at 25° C.

3. An oil base drilling fluid, comprising an oil, a finely divided weight material, a settling inhibitor, and an air-blown asphalt having a melting point of 260° F. to 310° F. and a penetration of 14 to 6 at 25° C.

4. An oil base drilling fluid, comprising an oil, a finely divided weight material, a high melting point air-blown asphalt and a natural asphalt, said air blown asphalt having a melting point of 260° F. to 310° F. and a penetration of 14 to 6 at 25° C.

GEORGE MILLER.